United States Patent [19]
Kuwabara

[11] Patent Number: 6,065,136
[45] Date of Patent: *May 16, 2000

[54] SYSTEM FOR REMOTE DIAGNOSIS OF DEVICE TROUBLES

[75] Inventor: Shoji Kuwabara, Osaka, Japan

[73] Assignee: Shimadzu Corporation, Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/985,403

[22] Filed: Dec. 5, 1997

[30] Foreign Application Priority Data

Feb. 18, 1997 [JP] Japan .................................. 9-033481

[51] Int. Cl.[7] ........................... H02H 3/05; H03K 19/003
[52] U.S. Cl. .............................. 714/31; 714/25; 714/46; 709/217
[58] Field of Search .................. 395/183.07, 183.01, 395/183.14, 183.15, 183.22, 185.01, 200.47, 200.48, 200.49, 200.68, 200.72; 714/31, 25, 38, 39, 46, 48; 370/242; 709/217, 218, 219, 238, 242

[56] References Cited

U.S. PATENT DOCUMENTS

| | | | |
|---|---|---|---|
| 5,588,009 | 12/1996 | Will | 371/33 |
| 5,644,706 | 7/1997 | Ruigrok et al. | 395/185.01 |
| 5,742,762 | 4/1998 | Scholl et al. | 395/200.03 |
| 5,771,354 | 6/1998 | Crawford | 395/200.59 |
| 5,819,110 | 10/1998 | Motoyama | 395/200.12 |
| 5,897,498 | 4/1999 | Canfield, II et al. | 660/437 |
| 5,909,493 | 6/1999 | Moyama | 380/25 |

*Primary Examiner*—Dieu-Minh T. Le
*Attorney, Agent, or Firm*—Majestic, Parsons, Siebert & Hsue P.C.

[57] ABSTRACT

A system for carrying out remote diagnosis is established between a maker and its users. Each user has a device controlled by its control computer and the maker has a trouble-diagnosing computer capable of diagnosing troubles which occur in its device. Public telecommunication lines including relay stations each capable of receiving and storing electronic mail messages connect these computers. The control computer of each user has a diagnostic data memory for storing diagnostic data which are used for diagnosing troubles occurring in the device and is capable of setting the diagnostic data in a form of electronic mail receivable by the relay stations. The maker's trouble-diagnosing computer is capable of reading out and saving electronic mail messages from the user's control computers stored at an associated one of the relay stations.

6 Claims, 4 Drawing Sheets

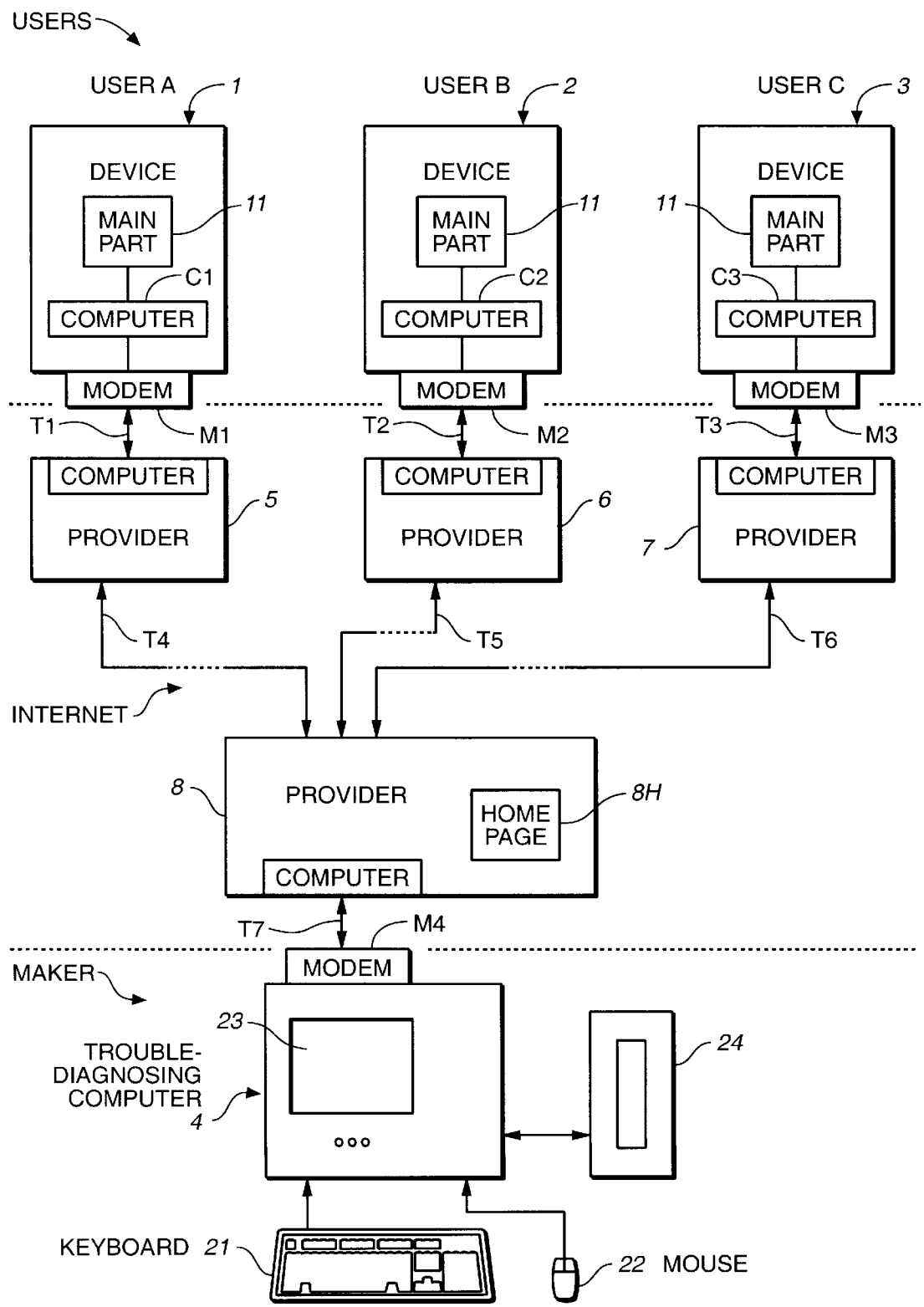
FIG._1

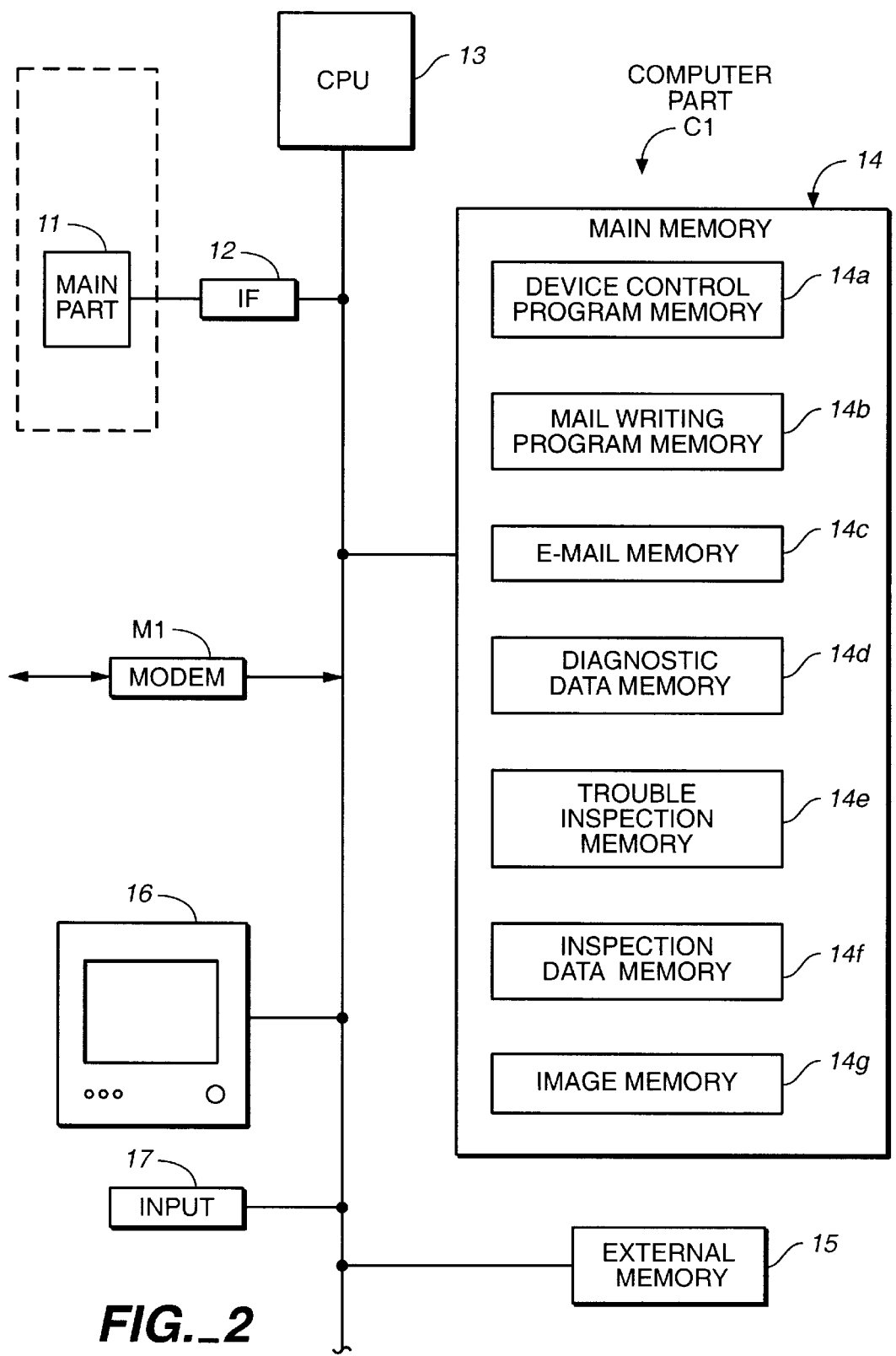
FIG._2

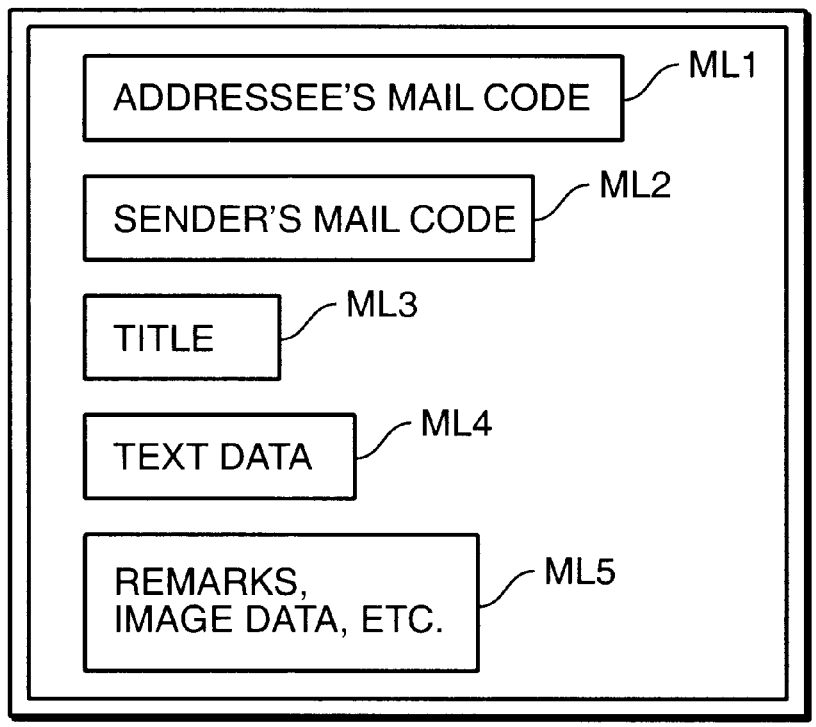
FIG._3
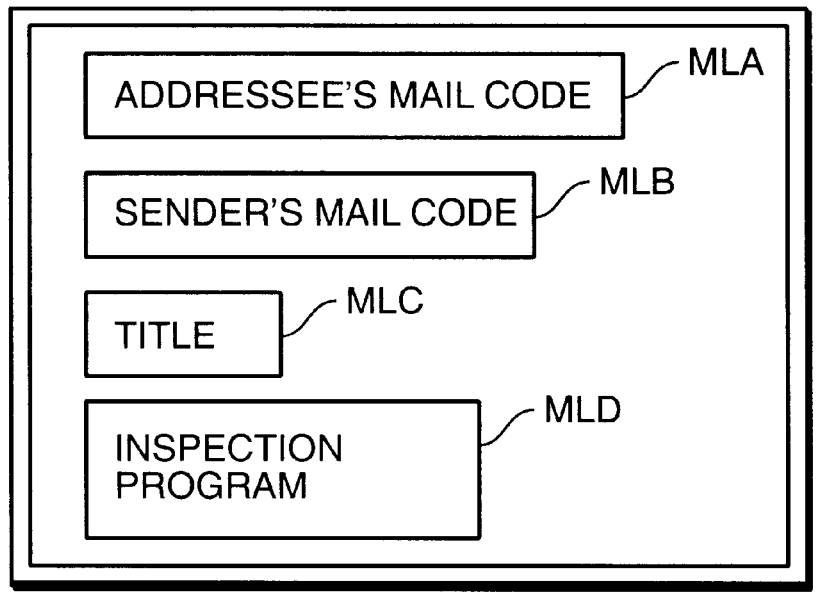
FIG._4

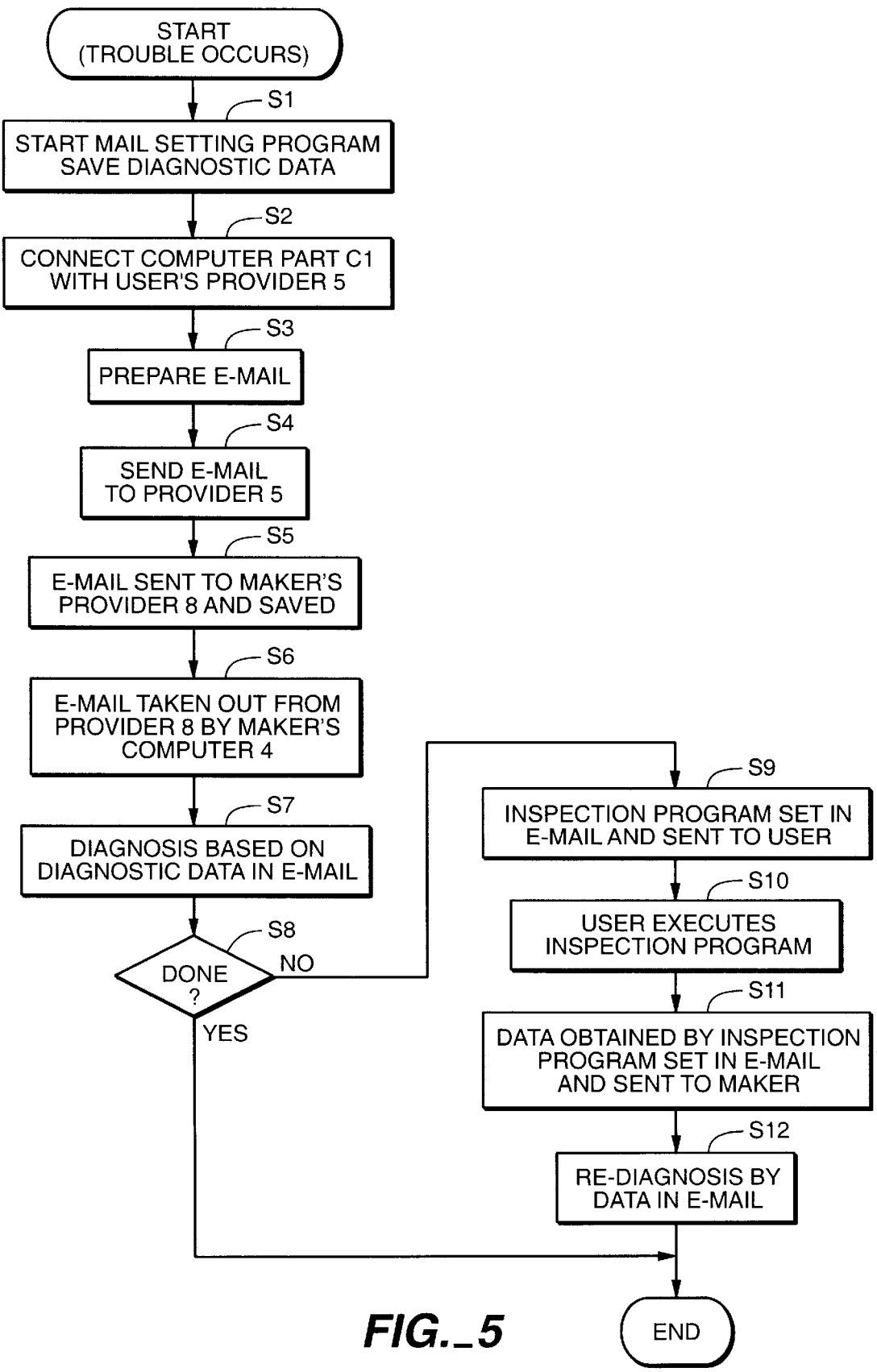
FIG._5

SYSTEM FOR REMOTE DIAGNOSIS OF DEVICE TROUBLES

BACKGROUND OF THE INVENTION

This invention relates to a system which uses a computer to carry out diagnosis of troubles which may occur in devices installed at users' premises and in particular to the technology of carrying out remote diagnoses of troubles in such devices by using a trouble-diagnosing computer set at their maker's place.

Recently, there is an increasing number of devices for analysis and measurement, as well as industrial apparatus, consisting of a main part and a computer for carrying out control processes. As devices and apparatus are becoming highly complicated, it is common to add a computer part to them for driving the main part and carrying out analysis of data obtained by operating the main part. If any trouble occurs in such a highly complicated apparatus installed at a user's place, however, it is often the case that the user alone cannot attend to it. In part for this reason, makers of such sophisticated apparatus nowadays are required to provide a user-support system such that any trouble which may occur can be quickly acted upon. Many makers are now equipped with a trouble-diagnosing computer installed at their own premises so as to maintain a direct access to the computer parts of the users' apparatus through a modem or a local area network (LAN) such that the nature of the trouble can be grasped in real time, for example, by driving the apparatus from the maker's computer and that the trouble can even be eliminated from a distance.

Prior art systems for such remote diagnosis have not been satisfactory for several reasons. Firstly, it was not possible to serve a plurality of users simultaneously, the maker's computer often becoming occupied for a long time with the work for one of the user's. Secondly, the telephone bill may become significantly large if the maker and the user are far apart. If the maker and the user are very far apart, say, in different countries, their working hours may be different such that there may be nobody at the maker's premises when a user experiences a trouble. When there is a possibility that sensitive data such as a trade secret may leak out, depending on the manner of connecting telephone lines (such as whether an operator serves to connect the lines) or whether the computers of the maker and the user are directly connected, the setting of a system for remote diagnosis itself becomes a difficult problem.

SUMMARY OF THE INVENTION

It is therefore an object of this invention to provide a system for remote diagnosis of devices which is capable of serving a plurality of users simultaneously, does not incur high telephone expenses, is not adversely affected by the time difference between the places of the maker and the user or by the manner in which the user is connected to a public telecommunication line, and is not troubled by the possibility of leakage of any business secrets.

A system according to this invention, with which the above and other objects can be accomplished, may be characterized firstly as comprising users' devices each including a main part and a computer part and a maker's trouble-diagnosing computer for remote diagnosis of troubles and wherein they are connected in a communication-exchanging relationship through public telecommunication lines including relay stations (or providers) having the capability of receiving and storing electronic mail messages. Each computer part of the user's devices includes a data storing means for storing diagnostic information which will become necessary when a trouble occurs and an e-mail setting means for setting such diagnostic information in the form of electronic mail receivable by the relay stations, and the maker's trouble-diagnosing computer includes a readout means for taking out electronic mail messages received by and stored in one of the relay stations and taking them in.

According to a preferred embodiment of the invention, each computer part of the users' devices is adapted to carry out inspections of necessary portions of the main part when a trouble has been detected and the aforementioned e-mail setting means is designed so as to be capable of setting diagnostic data obtained by such inspections at the time of occurrence of a trouble.

In such a system embodying this invention, diagnostic information which will become necessary when a trouble occurs (such as history of troubles) is sequentially stored by the data storing means while the users' devices (each comprising a main part and a computer part for control and processing) are in operation. When a trouble occurs in one of the users' devices, its e-mail setting means is activated either by the user's operator or automatically and the diagnostic information is set in the form of electronic mail receivable by the relay stations. The electronic mail thus set is transmitted to a relay station on the side of the user through public telecommunication lines. If different relay stations are associated with the user and the maker, the electronic mail is further transmitted from the relay station on the side of the user to that on the side of the maker and stored there.

In the meantime, the readout means of the maker's trouble-diagnosing computer keeps checking through public telecommunication lines whether any electronic mail has been delivered to the maker's relay station. If there is, it is thereby retrieved (or downloaded) into the computer. In other words, the user's electronic mail is delivered to the maker without having the computers of the user and the maker directly connected but only indirectly through the Internet. On the basis of the diagnostic information delivered to the maker through the electronic mail, the trouble-diagnosing computer of the maker analyzes the details of the trouble and takes steps against the trouble.

According to the preferred embodiment of the invention described above, the computer part of the user's device undertakes to inspect its main part and the results of such inspection are set in the form of electronic mail and then delivered to the maker in a similar manner for a more detailed study of the trouble and its causes.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a block diagram of a system embodying this invention;

FIG. 2 is a block diagram of the device of one of the users which is a part of the system shown in FIG. 1;

FIG. 3 is an example of mail format sent from a user to the maker in the system of FIG. 1;

FIG. 4 is an example of mail format sent from the maker to a user; and

FIG. 5 is a flow chart of the operations by the system of FIG. 1.

DETAILED DESCRIPTION OF THE INVENTION

Next, the invention will be described by way of an example with reference to FIGS. 1 and 2. In this example, there are three users (Users A, B and C) each having a device 1, 2 or 3, respectively, a trouble-diagnosing computer 4 which is installed at the maker's place which may be far away and has the function of diagnosing troubles of these devices, and providers 5–8 serving as relay stations for carrying out long-distance telecommunications between Users A–C and the maker. The users' devices 1–3, the maker's trouble-diagnosing computer 4 and the providers 5–8 are connected through telephone lines (public telecommunication lines) T1–T7 as shown in FIG. 1. In other words, this system connects the users with the maker through the Internet system. It should be remembered that Users A–C are generally mutually independent business entities, having no relationship whatsoever among them and being common only in that they all bought and use a device produced and sold by the same maker. The computer part C1 of the device 1 of User A is connected to one of the providers 5 through a modem M1 and telephone line (public telecommunication line) T1, the computer part C2 of the device 2 of User B is connected to another of the providers 6 through another modem M2 and telephone line T2, and the computer part C3 of the device 3 of User C is connected to still another of the providers 7 through a modem M3 and telephone line T3. The maker's computer 4 is connected to a provider 8 for the maker through another modem M4 and telephone line T7. The users' providers 5–7 and the maker's provider 8 are connected through telephone lines T5–T7 which may be selectably used as is common in ordinary Internet communications.

Since the users' devices 1–3 are all similarly structured, only the device 1 of User A will be described next with reference to FIG. 2. As explained above generally, the device 1 comprises a main part 11 and a computer part C1 for effecting control. The main part 11 may include mechanical and electrical components necessary, for example, for carrying out an analysis of a specified kind, adapted to be driven on the basis of control signals received from the computer part C1 through an input/output interface IF 12. Data which are obtained as a result of operating the main part 11 are transmitted from the main part 11 through the input/output interface IF 12 to the computer part C1.

The computer part C1 uses a central processing unit (CPU) 13 for carrying out necessary control for driving the main part 11 and, for example, calculations of data necessary for obtaining results of analysis (if the device is for carrying out analysis of whatever kind), a main memory 14 for storing programs necessary for the operation of the CPU 13 and an external memory 15 such as a hard disk. The computer part C1 additionally uses a monitor 16 for displaying a menu for operation and, for example, the results of analyses, an input means 17 such as a mouse for inputting commands and data necessary for device operations and a modem M1 for carrying out communications.

The main memory 14 comprises a random access memory RAM with many memory areas inclusive of a device control program memory 14a for having a main program for the overall control of the device 1 loaded thereon, a mail writing program memory 14b for storing a program for writing diagnostic information on troubles in the form of electronic mail to be sent to the maker, an e-mail memory 14c for storing the electronic mail which has been written, a diagnostic data memory 14d for storing various kinds of diagnostic data on troubles obtained as the device 1 is operated, a trouble inspection program memory 14e for storing a program for carrying out an inspection of necessary parts when a trouble has occurred, an inspection data memory 14f for storing inspection data obtained by carrying out the program for inspection, and an image memory 14g for storing image data for images on the monitor 16. The aforementioned mail writing program memory 14b and e-mail memory 14c together serve as the aforementioned e-mail setting means (or an Internet mailer such as Netscape Mail).

The external memory 15 serves not only to store computer programs such as device control and processing programs and mail writing programs which are downloaded onto the program memories 14a and 14b in response to a command from the CPU 13 but also to store and save results of analyses obtained by operating the device 1.

Examples of diagnostic data stored in the diagnostic data memory 14d include history of errors, the operation log (or the records of operating programs) and ON/OFF conditions of input/output signals for the hardware such as sensors and motors of all kinds. These diagnostic data are normally collected and stored automatically as long as the device 1 is operating, whether or not there is an occurrence of any trouble.

In the case of the system being described, the trouble-diagnosing program is adapted to be transmitted from the maker's place whenever necessary to be loaded in the program memory 14e and the inspection program is executed.

Each of the providers 5–8 is an ordinary kind of Internet provider capable of carrying out communications when accessed from the computer of a user or a maker, having a computer adapted to receive, store and manage electronic mail. These providers 5–8 are also adapted to transmit electronic mail messages stored therein and managed thereby to the computer of a user or a maker when accessed thereby. The provider 8 has a home page 8H for the maker where, for example, a trouble inspection program is uploaded such that each user A–C can download it to his/her own computer part C1, C2 or C3 whenever necessary.

The maker's trouble-diagnosing computer 4 is equipped with a keyboard 21 and a mouse 22 as parts of the input means, a monitor 23 for display and an external memory device 24 for storing necessary programs and data such as programs for diagnosis, taking out mail and inspection programs that can be downloaded to the RAM of the trouble-diagnosing computer 4 to be executed, if needed. A mail readout program is a downloading means for retrieving any electronic mail message delivered from a user to the provider 8. The external memory 24 also stores a mail setting program for writing necessary information in the form of electronic mail receivable by the providers. Such a program is downloaded to the RAM of the trouble-diagnosing computer 4, whenever it is necessary, to write down required data in the form of electronic mail to be transmitted to the provider 8.

Next, operations of this exemplary system when there was a trouble in the device (for analysis) 1 of User A will be described as an example with reference to FIGS. 3 and 4, as well as the flow chart of FIG. 5. When a trouble is discovered in User A's device 1, its operator immediately operates its input means 17 to load a mail setting program onto the program memory 14d and starts it. At the same time, the information stored then in the diagnostic data memory 14d is processed for saving (Step S1). As the mail setting program is activated, a menu for necessary operations for setting electronic mail is displayed on the screen of the monitor 16. The operator connects the provider 5 to the computer part C1 with the telephone line T1, say, by clicking a mouse on the menu on the screen of the monitor 16 (Step S2). Thereafter, the mail code of the maker is inputted in the addressee mail code column ML1 (shown in FIG. 3) from the input means 17 although it is usually already inputted such that the user will not be required to input it. The mail code of User A himself/herself is inputted in the sender's mail code column ML2. Next, a title for the message (such as "trouble"), indicating that this message is about a trouble, is inputted in the title column ML3. The content of each of the entry columns ML1–ML3 is saved in the e-mail memory 14c. Next, the mouse is clicked again on the menu displayed on the screen of the monitor 16 to enter the information stored in the diagnostic data memory 14d as the diagnostic information to be transmitted by electronic mail. The data stored in the diagnostic data memory 14d are placed as text data in the data column ML4 of FIG. 3 and are stored in the e-mail memory 14c. If necessary, explanations of the occurrence of the trouble and image data stored in the image memory 14g may be placed in the message column ML5 to have them stored also in the e-mail memory 14c.

After an electronic mail message is thus completed (Step S3), it is transmitted through the modem M1 to the provider 5, say, by clicking the mouse on an appropriate spot on the displayed menu (Step S4). This completes the operations by the e-mail setting program on the part of User A, and the connection between the computer C1 and the provider 5 through the telephone line T1 is terminated.

When this electronic mail from User A is received, the provider 5 identifies from its addressee mail code column ML1 that it has been addressed to the maker's provider 8 and serves to transmit it to the addressed provider 8 through a telephone line T4 considered to be the optimum route. The provider 8 stores and saves the received electronic mail (Step S5).

On the maker's computer 4, there is loaded a mail retrieval program such that electronic mail messages from the users delivered to the provider 8 can be retrieved at appropriate times and taken, say, into the RAM. When a message is downloaded, the maker's computer 4 activates a diagnostic program to retrieve the diagnostic data therein and, if necessary, to display image data from an image memory on the screen of the monitor (Step S6). After the details of the trouble have been understood and its cause has been analyzed (Step S7), an appropriate step is taken in response such as a direct telephone connection from the maker to User A to give instructions or a call to a service division of the maker. A mail setting program may also be activated to set the response in the form of electronic mail to be transmitted from the maker's provider 8 to the user's provider 5. If the trouble was due to a bug in the software for the user's computer part C1, for example, a debugged software program may be set similarly in the form of electronic mail to be sent through the Internet from the maker's provider 8 to the user's provider 5 such that the correct software will eventually be installed on the user's computer part C1. If this completes the trouble shooting against the trouble in the device 1 of User A, the processes on the part of the maker is also completed (YES in Step S8).

If the diagnostic data sent by the user through electronic mail are not enough for the maker to make an appropriate diagnosis (NO in Step S8), a program for trouble inspection is set in the form of electronic mail by the mail setting program and sent to User A through the Internet communication from the maker's provider 8 to the user's provider 5 (Step S9). For this transmission, the mail code of User A is inputted in the addressee's mail code column MLA (shown in FIG. 4) although it is usually inputted preliminarily. The maker's own mail code is inputted in the sender's mail code column MLB. Next, a title for the message (such as "inspection program", indicating that this message is about an inspection program for the user's trouble) is inputted in the title column MLC. The content of each of the entry columns MLA–MLC is saved in an e-mail memory (not shown). Next, the inspection program sent through electronic mail is stored in the data content column MLD.

The computer part C1 of User A, when the electronic mail from the maker is received through its provider 5, loads the inspection program included in the mail in its trouble inspection program memory 14e and carries out the inspection (Step S10). The inspection data thus obtained by executing this inspection process are sequentially stored in the inspection data memory 14f. After the inspection is completed, the results are set in the form of electronic mail and sent to the maker as in the case of the diagnostic data (Step S11).

Depending on the circumstances of the trouble, User A may retrieve through the Internet the inspection program which is already uploaded on the home page 8H of the maker's provider 8, load it in its trouble inspection program memory 14e and execute it. The inspection data obtained by the inspection are similarly delivered to the maker through electronic mail. In this manner, a more accurate and quick response may be expected. The maker will understand the accurate description of the trouble based on the inspection data included in the electronic mail and carry out analyses (Step S12). In the end, the maker will respond either directly through telephone or through electronic mail to complete the diagnosis of the trouble.

If a message reporting a trouble from another user (such as User B) is sent through electronic mail while the trouble of User A's device 1 is being worked upon, such a later arriving message is received by and stored at the maker's provider 8. As soon as the maker's work for User A is completed, the mail from User B is downloaded onto the maker's computer 4 and the maker undertakes to diagnose the trouble of User B. Since electronic mail messages can be sent through the Internet even from a low-level computer such as a personal computer, the maker may be able to communicate with User B with a personal computer which may happen to be unused while the trouble of User A is being addressed to by its trouble-diagnosing computer 4. In other words, the system according to this invention is a support system capable of responding to a plurality of users at the same time.

Since diagnostic data from the users are delivered through the Internet to and stored in the maker's provider 8, there is no limitation as to the time of their receipt. In other words, even a big time difference between the places of the user and the maker does not affect the operations of the system. Since the Internet has a high degree of freedom in the access to a provider, neither does the mode of connection of the user to a public telecommunication line adversely affect the setting of the system. Since the computers of the maker and the user are not directly connected, furthermore, there is no fear of leakage of sensitive computer data. Since the connection between each computer to its provider may be relatively short, unreasonably high telephone charges can also be avoided.

It now goes without saying that the present invention is not limited to the example described above. Many modifications and variations are possible within the scope of the invention. For example, it is not necessary to keep any inspection program uploaded on the home page at the maker's provider 8 so that the users can retrieve it therefrom. The inspection program may be preliminarily stored in the users' computers. As another example, a user may share the same provider with the maker such that there is only one provider between the user and the maker.

What is claimed is:

1. A system for remote diagnosis of device troubles, said system comprising:

user's device including a main part and a control computer for controlling said main part;

a trouble-diagnosing computer capable of diagnosing troubles which occur in said main part; and relay stations each capable of receiving and storing electronic mail messages, said relay stations being connected together and with said control computer and said trouble-diagnosing computer through public telecommunication lines;

said control computer including a diagnostic data memory preliminarily storing therein diagnostic data which are expected to be used for diagnosing troubles which are anticipated to occur in said main part and mail-setting means for setting said diagnostic data in a form of electronic mail receivable by said relay stations, said trouble-diagnosing computer including readout means for reading out and saving therein electronic mail messages from said control computer stored at an associated one of said relay stations.

2. The system of claim 1 wherein said control computer is capable of carrying out inspections of said main part when a trouble occurs therein and said mail-setting means is capable of setting inspection data obtained by said inspections in a form of electronic mail.

3. The system of claim 1 wherein said control computer serves to cause specified diagnostic data related to the troubles to be sequentially stored in said diagnostic data memory.

4. A method for carrying out a remote diagnosis of a user's device, said method comprising the steps of:

a control computer associated with said user's device, said control computer including a diagnostic data memory and mail-setting means for setting data in a form of electronic mail;

providing a trouble-diagnosing computer capable of diagnosing troubles which occur in said user's device;

providing relay stations each capable of receiving and storing messages in said form of electronic mail set by said mail-setting means, said relay stations being connected together with said control computer and said trouble-diagnosing computer through public telecommunication lines;

preliminarily storing in said diagnostic data memory diagnostic data which are expected to be used for diagnosing troubles which are anticipated to occur in said user's device;

causing said mail-setting means, when a trouble occurs in said user's device, to set an e-mail message regarding said trouble and transmitting said e-mail message to one of said relay stations associated with said user's device through public telecommunication lines; and causing said e-mail message to be transmitted to said trouble-diagnosing computer, said trouble-diagnosing computer including readout means for reading out and saving therein electronic mail messages from said control computer stored at an associated one of said relay stations.

5. The method of claim 4 further comprising the steps of:

transmitting a response message responsive to said trouble from said trouble-diagnosing computer through said relay stations to said user's device; and storing said response message in said diagnostic data memory.

6. The method of claim 5 further comprising the steps of:

causing said control computer to carry out an inspect said trouble in said user's device according to said response message and to transmit a report on results of said inspection to said trouble-diagnosing computer.

* * * * *